(12) United States Patent
Gao et al.

(10) Patent No.: US 10,783,673 B2
(45) Date of Patent: Sep. 22, 2020

(54) METHOD AND APPARATUS FOR GENERATING HEATMAP

(71) Applicant: HUAWEI TECHNOLOGIES CO., LTD., Shenzhen, Guangdong (CN)

(72) Inventors: Lisheng Gao, Shenzhen (CN); Bing Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/279,622

(22) Filed: Feb. 19, 2019

(65) Prior Publication Data
US 2019/0180480 A1    Jun. 13, 2019

Related U.S. Application Data

(63) Continuation of application No. PCT/CN2017/077942, filed on Mar. 23, 2017.

(30) Foreign Application Priority Data

Aug. 19, 2016 (CN) .......................... 2016 1 0697944

(51) Int. Cl.
| | |
|---|---|
| *G06T 11/20* | (2006.01) |
| *G06T 11/00* | (2006.01) |
| *G06F 16/00* | (2019.01) |

(52) U.S. Cl.
CPC ............ *G06T 11/001* (2013.01); *G06F 16/00* (2019.01); *G06T 11/206* (2013.01)

(58) Field of Classification Search
None
See application file for complete search history.

(56) References Cited

U.S. PATENT DOCUMENTS

| 9,727,669 B1* | 8/2017 | Wilson ................... G06Q 50/01 |
| 2014/0278802 A1 | 9/2014 | MacPherson |

(Continued)

FOREIGN PATENT DOCUMENTS

| CN | 103605716 A | 2/2014 |
| CN | 104199891 A | 12/2014 |

(Continued)

OTHER PUBLICATIONS

International Search Report and Written Opinion issued in International Application No. PCT/CN2017/077942 dated Jun. 19, 2017, 20 pages.

(Continued)

*Primary Examiner* — Diane M Wills
(74) *Attorney, Agent, or Firm* — Fish & Richardson P.C.

(57) ABSTRACT

Example methods and apparatus for generating a heatmap are described. One example method includes dividing a current display region of an original image on a screen into cells. The basic heat of a heat point region in each cell is calculated according to statistics and a heat weight for generating a heatmap this time, and diffusion heat to which each pixel in the current display region is subject is calculated according to the basic heat of the heat point region in the cell. The total heat of each pixel in the current display region is obtained, and a color corresponding to the total heat of each pixel in the current display region is presented in the current display region of the original image according to a preset heat presentation correspondence to obtain a heatmap of the current display region.

18 Claims, 5 Drawing Sheets

(56) References Cited

U.S. PATENT DOCUMENTS

| | | |
|---|---|---|
| 2014/0333651 A1 | 11/2014 | Cervelli et al. |
| 2015/0187102 A1 | 7/2015 | Park et al. |
| 2015/0235266 A1 | 8/2015 | Jain et al. |
| 2016/0147789 A1 | 5/2016 | Sharifi et al. |

FOREIGN PATENT DOCUMENTS

| | | | | |
|---|---|---|---|---|
| CN | 104239617 A | * | 12/2014 | |
| CN | 104239617 A | | 12/2014 | |
| CN | 104657417 A | | 5/2015 | |
| CN | 104731894 A | * | 6/2015 | ............. G06F 16/00 |
| CN | 104731894 A | | 6/2015 | |
| CN | 105844681 A | | 8/2016 | |

OTHER PUBLICATIONS

Duchowski et al, "Aggregate Gaze Visualization with Real-time Heatmaps," Proceedings of the Symposium on Eye Tracking Research and Applications (ETRA) 2012, Santa Barbara, California, Mar. 28, 2012, 8 pages.

Extended European Search Report issued in European Application No. 17840740.9 dated May 2, 2019, 11 pages.

Meier et al., "Heattile, a New Method for Heatmap Implementations for Mobile Web-Based Cartographic Applications," In Thematic Cartography for the Society, Springer, Cham., Jan. 2014, 12 pages.

Office Action issued in Chinese Application No. 201610697944.8 dated Aug. 27, 2019, 5 pages.

* cited by examiner

• Pixel A

• Pixel B

• Pixel C

METHOD AND APPARATUS FOR GENERATING HEATMAP

CROSS-REFERENCE TO RELATED APPLICATIONS

This application is a continuation of International Application No. PCT/CN2017/077942, filed on Mar. 23, 2017, which claims priority to Chinese Patent Application No. 201610697944.8, filed on Aug. 19, 2016, The disclosures of the aforementioned applications are hereby incorporated by reference in their entireties.

TECHNICAL FIELD

This application relates to the field of image processing, and in particular, to a method and an apparatus for generating a heatmap.

BACKGROUND

With quick development of Internet technologies and electronic technologies, the Internet and intelligent terminals have already become indispensable content in daily life of people. For example, a web page is visited by using the Internet to browse required information, a location and a navigation route are queried by using an electronic map, and the like.

Usage information (locating information in a map and a click position in a web page) of a user may be aggregated into density data. The density data describes density of a region at a time point or within a time period, and describes a correspondence between a region location and a quantity of persons or a quantity of clicks. The density data may be used to provide much convenience to the user. For example, a congestion situation of a road and a congestion situation of a location may be predicted by using density data in an electronic map. Density data within different time periods that is aggregated and collated may further demonstrate information and a rule, such as distribution of population residence places and distribution of workplaces.

In heatmap technologies, values are identified by using continuous or discrete color levels. In this way, distribution and a change rule of a variable in two-dimensional space may be demonstrated vividly and naturally. Therefore, a heatmap is applied to various scenarios to present density data and reflect a region feature. For example, when density data of different regions is presented by using color levels in a heatmap in an electronic map, a "hot region" in which data is dense and a "cold region" in which data is sparse can be clearly presented on the map, so as to demonstrate important statistics such as population distribution. A correspondence between a region in a web page and a quantity of clicks of a user is embodied by using a heatmap, so that website management personnel determine a region that is often clicked by a user but that is not a link, and consider setting a resource link in the region.

Currently, in an image with a proper proportional scale, a heatmap is usually drawn according to density data by using a point depiction method. A frequently used drawing method is drawing one heat point for one data point, or drawing one heat point for a sum of data in one region. On the heatmap based on this, once the proportional scale of the image changes, the heatmap cannot reflect a region feature continuously and accurately.

Using an example in which a heatmap is applied to an electronic map, a characteristic of the electronic map is that geographical location information is completed and continuous. However, for a heatmap generated by using existing heatmap technologies, when a user zooms in the map, the heatmap is presented as a scatter chart, and the entire scatter chart cannot reflect a distribution rule of density data in different regions. When the map is zoomed out to a specific level, the heatmap is presented as a big heat point, and coverage of the point even exceeds coverage of actual data. This is of no practical significance.

It can be accordingly known that for the heatmap generated by using the existing heatmap technologies, when a zoom ratio of an image is adjusted, the heatmap cannot accurately embody an actual distribution feature and a region feature of the image. In addition, continuity of the heatmap is poor.

SUMMARY

Embodiments of the present invention provide a method and an apparatus for generating a heatmap, so as to implement that a heatmap reflects a region feature continuously and accurately, and a change in an image zoom ratio does not affect continuity and accuracy of the heatmap.

To achieve the foregoing objective, the following technical solutions are used in this application.

According to a first aspect, a method for generating a heatmap is provided, where the method includes: first dividing a current display region of an original image on a screen into square cells having a side length of $r=\alpha*r_1$; then separately calculating, according to statistics, which includes at least one data point used to reflect a region feature of the original image, of the original image and a heat weight $w=\beta*w_1$ for generating a heatmap this time, basic heat H of a heat point region that is in each cell and in which a center point of the cell is used as a circle center and x is used as a radius, where x is less than or equal to $$\frac{r}{2},$$

and basic heat of each pixel in one heat point region is H; separately calculating, according to the basic heat of the heat point region in each cell, diffusion heat to which each pixel in the current display region is subject, where diffusion heat to which one pixel located in a diffusion heat region of at least one cell is subject is generated by a heat point region in each of the at least one cell; based on this, separately obtaining total heat of each pixel in the current display region according to basic heat of the pixel in the current display region and the diffusion heat to which the pixel in the current display region is subject; and finally, presenting, in the current display region of the original image according to a preset heat presentation correspondence, a color corresponding to the total heat of each pixel in the current display region, to obtain a heatmap of the current display region.

$r_1$ is a side length of a cell that is obtained through division when a heatmap of the original image is previously generated, and $\alpha$ is a cell change function related to a zoom ratio. $w_1$ is a heat weight used when the heatmap of the original image is previously generated, and $\beta$ is a heat weight change function related to the zoom ratio. The statistics of the original image includes at least one data point used to reflect a region feature of the original image. A diffusion heat region of one cell is a region in a circle, in which a center of the cell is used as a circle center and R is used as a radius, except a heat point region in the cell, and R is greater than r. The heat presentation correspondence includes a heat interval and a color in a one-to-one correspondence with each heat interval.

In the method for generating a heatmap provided in this application, first, each time a heatmap is generated, a heat point region and a diffusion heat region of each cell may include each location and detail in a current display region of the original image. Regardless of how a user adjusts the zoom ratio of the original image, the heatmap generated each time is continuous, ensuring continuity of the heatmap, so that the heatmap can reflect a region feature. Second, when a heatmap is locally generated, a side length r of a cell and a heat weight w are respectively correlated with a side length $r_1$ of a cell and a heat weight $w_1$ by using the cell change function α and the heat weight change function β, where the side length $r_1$ of the cell and the heat weight $w_1$ are used when a heatmap is previously generated. Based on this, by properly setting the cell change function α and the heat weight change function β, it can be ensured that an area of a region, which corresponds to one cell, in the original image is close each time a heatmap is generated, and heat in a same region in the original image is close each time a heatmap is generated. Regardless of how the user adjusts the zoom ratio of the original image, for a same location in the original image, a heat value at the location in a heatmap generated each time is close, ensuring accuracy of the heatmap.

Further, by means of the method for generating a heatmap after a cell is obtained through division in this application, when a data volume is large, compared with a point depiction method in the prior art, processing efficiency is greatly improved, a processing time is reduced, and a waiting time of the user that is spent when a heatmap is generated is reduced.

The original image is a basis for generating a heatmap, and the generated heatmap reflects a region feature of the original image. The current display region of the original image on the screen is a region that is seen by the user at a current zoom ratio on the terminal screen and that is in the original image, that is, a region that is displayed on the terminal screen and that is in the original image.

A heat point region in one cell is a predetermined region that is in the cell and in which a center point of the cell is used as a circle center and x is used as a radius. A heat point region in a cell is used to present, to a user in a heatmap, heat generated by a data point that is in the statistics of the original image and whose coordinates are located in a region, which corresponds to the cell, in the original image, and the heat is referred to as basic heat of the heat point region in the cell. When the basic heat is presented by using the heat point region in the cell, presentation is performed by using basic heat of each pixel in the heat point region in the cell, and the basic heat of each pixel in the heat point region in the cell is equal to the basic heat of the heat point region in the cell.

A diffusion heat region of a cell is a region at which heat radiated by a heat point region in the cell to the outside arrives. A diffusion heat region of a cell is defined as a region in a region, in which a center of the cell is used as a circle center and R is used as a radius, except a heat point region in the cell. A heat point region in a cell generates diffusion heat to each pixel in a diffusion heat region of the cell. A pixel located in a diffusion heat region of at least one cell is subject to a diffusion heat component from each of the at least one cell. Diffusion heat to which the pixel is subject is calculated according to all diffusion heat components to which the pixel is subject, where, x may be $$\frac{r}{2}.$$

With reference to the first aspect, in a possible implementation, to obtain a more elaborate heatmap and accurately reflect a feature of a statistic object in a region, a weight may be configured for the statistic object or a data point, so that as large as possible differences of obtained heat values are generated and can be embodied by using different colors. When a heatmap is generated, for a process of separately calculating, according to the statistics of the original image and the heat weight w for generating a heatmap this time, the basic heat H of the heat point region that is in each cell and in which the center point of the cell is used as the circle center and x is used as the radius, a processing manner for each cell is the same. Herein, using any cell (referred to as a first cell) in the current display region of the original image as an example, a specific process of calculating, according to the statistics of the original image and the heat weight w for generating a heatmap this time, basic heat H of a heat point region that is in the first cell and in which a center point of the first cell is used as a circle center and x is used as a radius is described as: calculating the basic heat H=N*w of the heat point region in the first cell. N is a total quantity of data points or statistic objects that are in the statistics of the original image and whose coordinates are located in a region, which corresponds to the first cell, in the original image.

The statistic object is a target individual used when a data point used for data analysis is obtained in the original image, and the data point is 2-tuple data that includes a location and a statistic parameter and that is generated after data statistics on the statistic object is collected in the original image.

Specifically, a type of N depends on a definition of w. If w is defined as a heat value weight of the data point, N is a total quantity of the data points that are in the statistics of the original image and whose coordinates are located in the region, which corresponds to the first cell, in the original image. Alternatively, if w is defined as a heat value weight of the statistic object, N is a total quantity of the statistic objects that are in the statistics of the original image and whose coordinates are located in the region, which corresponds to the first cell, in the original image.

With reference to the first aspect or any one of the foregoing possible implementations, in another possible implementation, to accurately and elaborately reflect, in the heatmap, heat at each location in the current display region of the original image, a pixel in the current display region is affected by diffusion heat generated by a heat point region in a cell surrounding the pixel. A heat point region in a cell generates larger diffusion heat for a pixel closer to the center point of the heat point region. Therefore, diffusion heat that is calculated according to a distance from a location of a pixel to the center of a cell may reflect actual data distribution more accurately. Specifically, when a heatmap is generated, a process of calculating the diffusion heat to which each pixel in the current display region is subject is the same. In this implementation, using any pixel (referred to as a first pixel) that is in the current display region and that is located in a diffusion heat region of at least one cell as an example, a specific process of calculating diffusion heat to which the first pixel is subject is described. A specific implementation is: first calculating, according to the basic heat of the heat point region in each cell, a diffusion heat component, to which the first pixel is subject, from the heat point region in the cell, and then using a weighted sum of at least one diffusion heat component to which the first pixel is subject as the diffusion heat to which the first pixel is subject, where the at least one diffusion heat component to which the first pixel is subject is generated by each cell to which at least one diffusion heat region in which the first pixel is located belongs.

With reference to the first aspect or either of the foregoing possible implementations, in another possible implementation, a process of calculating the diffusion heat component, to which the first pixel is subject, from the heat point region in each cell is the same, and a process of calculating a diffusion heat component, to which the first pixel is subject, from a heat point region in a second cell is described herein: calculating the diffusion heat component $$h = H * \frac{d-r}{r},$$

to which the first pixel is subject, from the second cell, where the second cell is any one of the cell to which at least one diffusion heat region in which the first pixel is located belongs, d is a distance from a location of the first pixel to a center of the second cell, and H is basic heat of the heat point region in the second cell.

With reference to the first aspect or any one of the foregoing possible implementations, in another possible implementation, in the current display region, diffusion heat to which a pixel that is located in a heat point region in a cell, but that is not in a diffusion heat region of any cell is subject is basic heat of the pixel.

A distance from a location of a pixel to the center of a cell is the distance d displayed in the current display region, and the distance d has a unit same as that of r. Alternatively, a distance from a location of a pixel to the center of a cell is a corresponding actual distance in the original image, and r is also an actual distance, which corresponds to a side length of the cell, in the original image, provided that content indicated by unit distances of d and r is the same.

With reference to the first aspect or any one of the foregoing possible implementations, in another possible implementation, to implement that each time a heatmap is generated at a different zoom ratio, a distance, which corresponds to the side length r of the cell, in the original image is close, and a heat value in a same region in the original image is close, α and β may be defined as functions related to a variable $\Delta Z$ of the zoom ratio. Specifically, $\alpha = a^{\Delta Z}$, where a is a preset cell change parameter, and a is greater than or equal to 1 and is less than or equal to 2; $\beta = b^{\Delta Z}$, where b is a preset heat weight change parameter, and b is greater than or equal to 1, and is less than or equal to 4; $\Delta Z$ is obtained by subtracting, from a zoom ratio for the original image when a heatmap is generated this time, a zoom ratio for the original image when a heatmap is previously generated.

With reference to the first aspect or any one of the foregoing possible implementations, in another possible implementation, when the solution in the first aspect is performed, that is, generating the heatmap of the current display region this time is generating the heatmap for the original image for the first time, and a case in which a heatmap is previously generated does not exist, $r_1$ is an initial value $r_0$ of the side length of the cell, and $w_1$ is an initial value $w_0$ of the heat weight. $r_0$ and $w_0$ are preset values.

With reference to the first aspect or any one of the foregoing possible implementations, in another possible implementation, to enable the defined α to implement that the distance, which corresponds to the side length r of the cell, in the original image is close each time the heatmap is generated at a different zoom ratio, a specific definition is: α is used to control an absolute value of a difference between actual lengths corresponding to r and $r_1$ in the original image to be less than or equal to a first preset threshold. To enable the defined β to implement that a heat value of a same region in the original image is close each time the heatmap is generated at a different zoom ratio, a specific definition is: β is used to control an absolute value of a difference of total heat values obtained each time the heatmap is generated in a same region in the original image to be less than or equal to a second preset threshold.

With reference to the first aspect or any one of the foregoing possible implementations, in another possible implementation, when the diffusion heat is calculated, a diffusion region range needs to be properly defined, so as to implement that the heatmap not only can accurately reflect heat at each location, but also can save computing resources. That is, a proper R needs to be set. In this implementation, R is less than or equal to 2r.

With reference to the first aspect or any one of the foregoing possible implementations, in another possible implementation, a pixel that is in the current display region of the original image and that is located in a diffusion heat region of a cell may also be located in a heat point region in a cell, and the pixel not only has basic heat, but also is subject to diffusion heat from another cell. Specifically, for each pixel that is in the current display region of the original image and that is located in a heat point region in a cell, a process of calculating total heat of the pixel is the same. In this implementation, using any pixel (referred to as a second pixel) that is in the current display region of the original image and that is located in a heat point region in a cell as an example, a specific implementation of obtaining total heat of the second pixel according to basic heat and diffusion heat is described as: adding diffusion heat, to which the second pixel is subject, to basic heat of the second pixel, to obtain the total heat of the second pixel; or performing weighting summation on diffusion heat, to which the second pixel is subject, to basic heat of the second pixel, to obtain the total heat of the second pixel.

With reference to the first aspect or any one of the foregoing possible implementations, in another possible implementation, a pixel that is in the current display region of the original image and that is located in a heat point region in a cell may not be located in a diffusion heat region of any cell; in this way, the pixel has only basic heat, and total heat of the pixel is the basic heat of the pixel.

With reference to the first aspect or any one of the foregoing possible implementations, in another possible implementation, for a pixel that is in the current display region of the original image, that is located only in a diffusion heat region of at least one cell, but that is not located in a heat point region in any cell, total heat of the pixel is diffusion heat to which the pixel is subject. Specifically, for any pixel that is in the current display region of the original image, that is located in a diffusion heat region of a cell, and that is not located in a heat point region in any cell, a process of calculating total heat of the pixel is the same. In this implementation, using any pixel (referred to as a third pixel) that is in the current display region of the original image, that is located in a diffusion heat region of a cell, and that is not located in a heat point region in any cell as an example, a specific implementation of obtaining total heat of the third pixel is that diffusion heat to which the third pixel is subject is the total heat of the third pixel.

According to a second aspect, an embodiment of the present invention provides an apparatus for generating a heatmap. The apparatus may implement the foregoing method. Functions of the apparatus may be implemented by using hardware, or may be implemented by using hardware executing corresponding software. The hardware or the software includes one or more modules corresponding to the foregoing functions.

With reference to the second aspect, in a possible implementation, a structure of the apparatus includes a processor and a transceiver, and the processor is configured to support the apparatus in execution of the method. The transceiver is configured to support communication between the apparatus and another network element. The apparatus may further include a memory. The memory is configured to: be coupled to the processor, and store a necessary program instruction and necessary data of the apparatus.

According to a third aspect, an embodiment of the present invention provides a computer storage medium, configured to store a computer software instruction used by the apparatus. The computer software instruction includes a designed program configured to perform the foregoing aspects.

The solution provided in the second aspect or the third aspect is used to implement the method for generating a heatmap provided in the first aspect. Therefore, the solution provided in the second aspect or the third aspect can achieve beneficial effects that are the same as those achieved by the solution in the first aspect. Details are not described herein.

DESCRIPTION OF EMBODIMENTS

Currently, a heatmap is generated at a fixed zoom ratio by using a point depiction method. When a user adjusts the image zoom ratio, the heatmap becomes discrete or converges as the zoom ratio changes. Consequently, the heatmap cannot accurately reflect a region feature.

The basic principle of this application is as follows: When a heatmap is generated, a parameter used when a heatmap is previously generated is referenced, so as to ensure that a same region in an original image has close areas and close heat at different zoom ratios, so that the generated heatmap can reflect a region feature of the image accurately and continuously.

Figure 1:
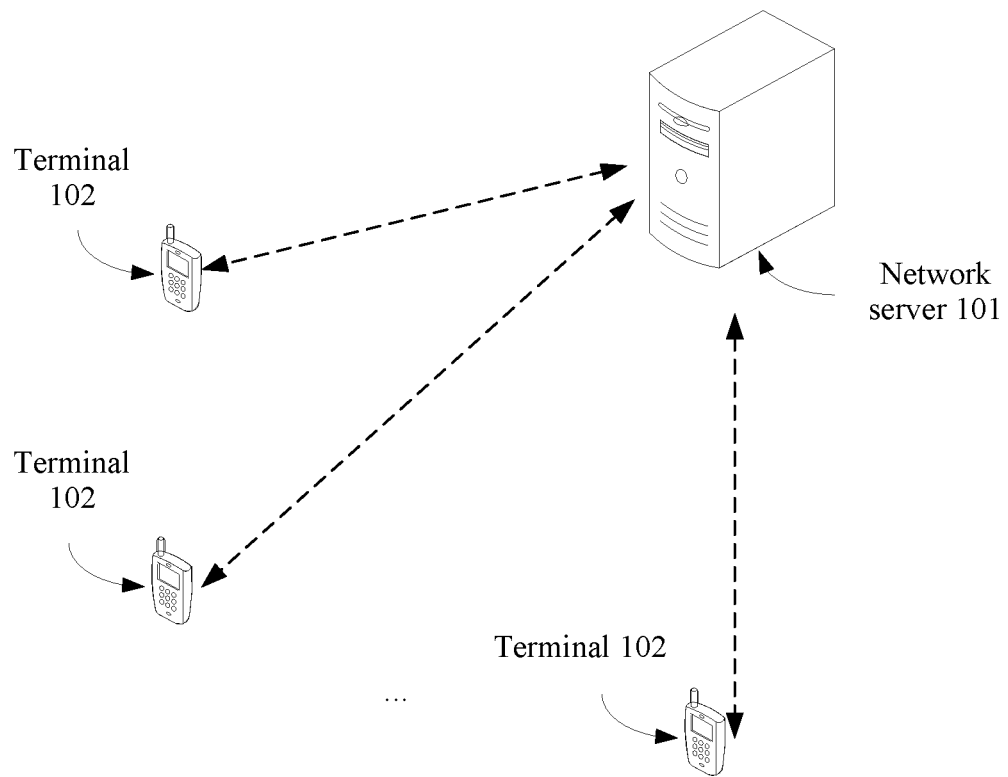
FIG. 1 is a schematic structural diagram of an Internet architecture in the prior art.

A method for generating a heatmap provided in embodiments of the present invention is applied to an Internet architecture shown in FIG. 1. The Internet architecture includes a network server 101 and at least one terminal 102.

In the architecture shown in FIG. 1, the method for generating a heatmap provided in the embodiments of the present invention is specifically applied to the terminal 102. The network server 101 collects statistics on user data of each terminal 102, to obtain statistics, and provides the statistics to each terminal 102 for data analysis. The terminal 102 interacts with the network server 101 by using the Internet, to obtain the statistics obtained by the network server 101 through statistics collection, so as to perform data analysis.

Further, the data analysis performed by the terminal 102 may include generating a heatmap, so that a user intuitively views the statistics.

The method for generating a heatmap provided in the embodiments of the present invention is performed by an apparatus 20 for generating a heatmap provided in the embodiments of the present invention. The apparatus 20 for generating a heatmap provided in the embodiments of the present invention may be a part or all of the terminal 102 in the architecture shown in FIG. 1.

Optionally, the terminal 102 may be a terminal device, such as a mobile phone, a tablet computer, a notebook computer, a personal computer (PC), an ultra-mobile personal computer (UMPC), a netbook, a personal digital assistant (PDA), or an in-vehicle device.

Figure 2:
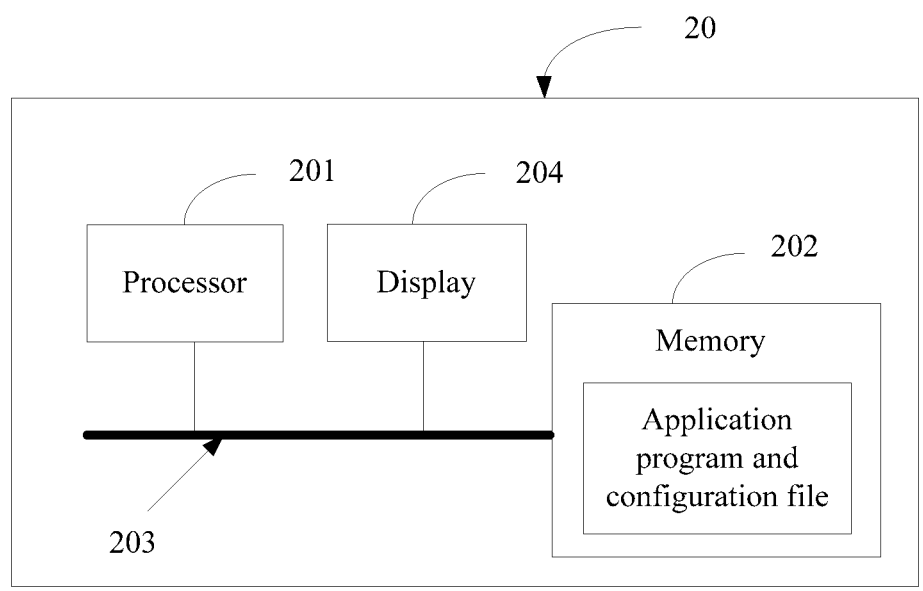
FIG. 2 is a schematic structural diagram of an apparatus 20 for generating a heatmap according to an embodiment of the present invention.

FIG. 2 is a schematic structural diagram of an apparatus 20, which is related to each embodiment of this application, for generating a heatmap.

As shown in FIG. 2, the apparatus 20 for generating a heatmap may include: a processor 201, a memory 202, a communications bus 203, and a display 204.

The memory 202 is configured to: store program code, and transmit the program code to the processor 201, so that the processor 201 executes the program code to implement various functions of the apparatus 20 for generating a heatmap. The memory 202 may be a volatile memory, such as a random access memory (RAM); or a non-volatile memory, such as a read-only memory (ROM), a flash memory, a hard disk drive (HDD), or a solid-state drive (SSD); or a combination of the foregoing types of memories.

The processor 201 is a control center of the apparatus 20 for generating a heatmap, and may be a central processing unit (CPU), may be an application-specific integrated circuit (ASIC), or may be one or more integrated circuits configured to implement the embodiments of the present invention, such as one or more microprocessors (DSP) or one or more field programmable gate arrays (FPGA). The processor 201 may run or execute the program code stored in the memory 202 and invoke data stored in the memory 202, so as to implement the various functions of the apparatus 20 for generating a heatmap.

The communications bus 203 may be an industry standard architecture (ISA) bus, a peripheral component interconnect (PCI) bus, an extended industry standard architecture (EISA) bus, or the like. The bus 203 may be classified into an address bus, a data bus, a control bus, and the like. For ease of illustration, the bus in FIG. 2 is represented by using only one bold line, but it does not mean that there is only one bus or one type of bus.

The display 204 may be a screen of the terminal 102, and is configured to present a heatmap to a user.

The embodiments of this application are described below in detail with reference to the accompanying drawings.

Some basic concepts are explained first before description.

A heat point region in one cell is a predetermined region that is in the cell and in which a center point of the cell is used as a circle center and x is used as a radius. A heat point region in a cell is used to present, to a user in a heatmap, heat generated by a data point that is in statistics of an original image and whose coordinates are located in a region, which corresponds to the cell, in the original image, and the heat is referred to as basic heat of the heat point region in the cell. When the basic heat is presented by using the heat point region in the cell, presentation is performed by using basic heat of each pixel in the heat point region in the cell, and the basic heat of each pixel in the heat point region in the cell is equal to the basic heat of the heat point region in the cell.

A diffusion heat region of a cell is a region at which heat radiated by a heat point region in the cell to the outside arrives. A diffusion heat region of a cell is defined as a region in a region, in which a center of the cell is used as a circle center and R is used as a radius, except a heat point region in the cell. A heat point region in a cell generates diffusion heat to each pixel in a diffusion heat region of the cell. A pixel located in a diffusion heat region of at least one cell is subject to a diffusion heat component from each of the at least one cell. Diffusion heat to which the pixel is subject is calculated according to all diffusion heat components to which the pixel is subject.

Figure 3:
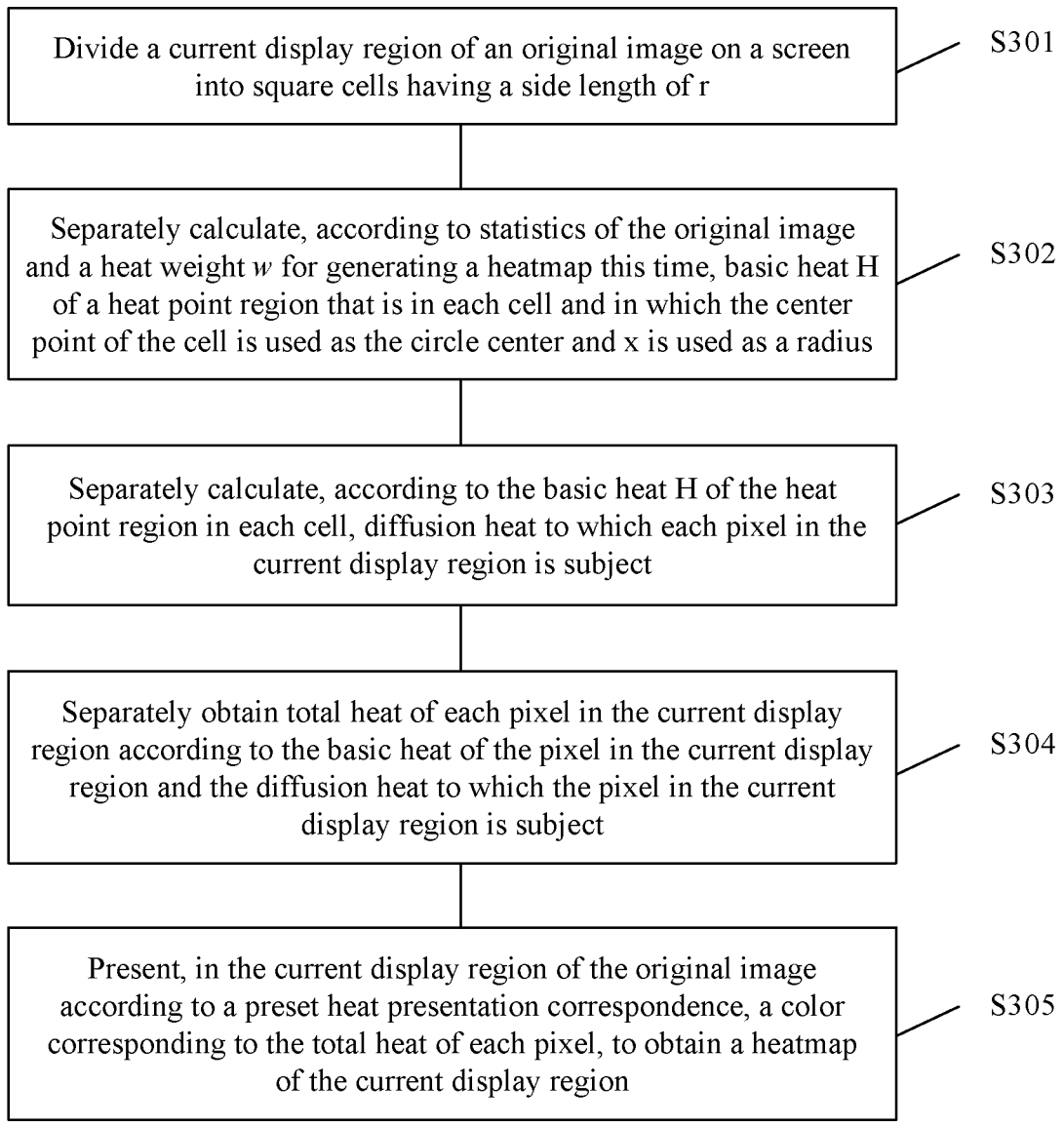
FIG. 3 is a schematic flowchart of a method for generating a heatmap according to an embodiment of the present invention.

On one hand, an embodiment of the present invention provides a method for generating a heatmap. As shown in FIG. 3, the method may include the following steps.

S301. Divide a current display region of an original image on a screen into square cells having a side length of r.

The current display region of the original image on the screen is a region that can be seen by a user at a current zoom ratio on the terminal screen and that is in the original image.

$r=\alpha *r_1$, where $r_1$ is a side length of a cell that is obtained through division when a heatmap of the original image is previously generated, and * is multiplication calculation.

It should be noted that when S301 is performed, if a side length of a remaining region on a boundary of the current display region of the original image is less than r when division is performed to obtain the cells, a part whose side length is less than r is used as one cell, that is, when division is performed to obtain the square cells having a side length of r, it is ensured to the utmost extent that the side length of the cell is r. Specifically, when S301 is performed, and division is performed to obtain the cells, whether the remaining region whose side length is less than r is on an upper boundary or a lower boundary, or is on a left boundary or a right boundary of the current display region may be set according to an actual requirement, and this is not specifically limited in this embodiment of the present invention, provided that each time a heatmap is generated, a same manner is used to process the remaining region whose side length is less than r.

Further, if the heatmap is generated for the original image for the first time when S301 is performed, that is, if generating the heatmap this time is generating the heatmap for the original image for the first time, $r_1$ is an initial value of the side length of the cell.

It should be noted that a value of $r_0$ may be set according to an actual requirement or an empirical value. This is not specifically limited in this embodiment of the present invention.

α is a cell change function related to a zoom ratio, and is used to control a speed of discretizing the heatmap. By setting a proper α function, side lengths of cells that are obtained through division when a heatmap is continuously generated twice for the original image may be controlled to meet a relationship.

Further, α is used to control an absolute value of a difference of actual lengths corresponding to r and $r_1$ in the original image to be less than or equal to a first preset threshold.

It should be noted that a value of the first preset threshold may be set according to an actual requirement. This is not specifically limited in this application. Specifically, a smaller specified first preset threshold causes more stable presentation effects of the heatmap at a high zoom ratio. However, it is difficult to adequately supplement image details. When the first preset threshold is set to be larger, the generated heatmap displays extra detail information. However, stability and continuity of the entire image are relatively poor. In actual application, the value of the first preset threshold may be eclectically set according to an actual requirement.

Optionally, for a function relationship between α and a zoom ratio, there may be multiple forms of power functions.

Optionally, an example of a power function relationship between α and a zoom ratio is provided herein, and the power function relationship specifically includes: $\alpha=a^{\Delta Z}$.

a is a preset cell change parameter, and a is greater than or equal to 1, and is less than or equal to 2. $\Delta Z$ is obtained by subtracting, from a zoom ratio for the original image when the heatmap is generated this time, a zoom ratio for the original image when the heatmap is previously generated.

It should be noted that a value of a may be set according to an actual requirement.

Specifically, when a=1, the side length of the cell does not change, an area, which corresponds to the cell, in the original image does not change with the zoom ratio, the heatmap displays extra detail information, but stability and continuity of the entire image are relatively poor. When a=2, the side length of the cell changes with the zoom ratio, the area, which corresponds to the cell, in the original image does not change with the zoom ratio, that is, an actual region indicated by the cell in the image is fixed, a presentation effect of the heatmap is stable when the heatmap is zoomed in, but it is difficult to adequately supplement or ignore details.

For example, the original image is an electronic map, and if it is assumed that the user zooms in the map by one level (therefore, $\Delta Z$ is 1), an actual area indicated by a cell on the map is only ¼ of an actual area originally indicated by a cell having a same size on the map. If data points are evenly distributed, a total data volume in a cell becomes approximately ¼ of an original data volume in the cell. To adapt to the change, and to ensure that a data volume in a cell when a heatmap is locally generated is close to a total data volume in the cell when a heatmap is previously generated, a side length r of the cell needs to correspondingly change. If $r=a^{\Delta Z}*r_1$, $\Delta Z=1$. That is, a side length of a cell becomes a times a side length of a cell used when a heatmap is previously generated, and an actual area indicated by a cell on the map is $$\left(\frac{a}{2}\right)^2$$

times an actual area originally indicated by a cell having a same size. In this case, if a is equal to 1, an actual area indicated by a cell on the map is ¼ of an actual area originally indicated by a cell having a same size. If a is equal to 2, an actual area indicated by a cell on the map is one times an actual area originally indicated by a cell having a same size, that is, on the electronic map, actual areas corresponding to cells obtained through division when a heatmap is generated twice are equal.

Preferably, a is 1.6.

Further, for the power function relationship between $\alpha$ and $\Delta Z$, in addition to the power function part, deformation may be further performed by adding a constant or a Z-related exponential function according to an actual requirement.

For example, $\alpha = a^{\Delta Z} + c$, where c may be a constant, or may be a Z-related exponential function.

S302. Separately calculate, according to statistics of the original image and a heat weight $w = \beta * w_1$ for generating a heatmap this time, basic heat H of a heat point region that is in each cell and in which a center point of the cell is used as a circle center and x is used as a radius.

Basic heat of each pixel in one heat point region is H.

Specifically, the statistics of the original image includes at least one data point used to reflect a region feature of the original image. The statistics of the original image may be obtained by the apparatus, which performs the method for generating a heatmap in this application, by interacting with a network server by using the Internet. The statistics includes at least one data point that is generated after the network server monitors the original image. Content and an obtaining process of the statistics of the original image are not described in this application again. Optionally, a data point may be statistic object density in a region.

x is less than or equal to $$\frac{r}{2}.$$

A value of x may be set according to an actual requirement. Preferably, x is equal to $$\frac{r}{2}.$$

Certainly, x may be a value close to $$\frac{r}{2}$$

and less than $$\frac{r}{2}.$$

The value of x is not specifically limited in this embodiment of this application.

Specifically, $w_1$ is a heat weight used when a heatmap of the original image is previously generated.

The heat weight is a weight coefficient configured for a data point (2-tuple data) or a statistic object when the heatmap is generated, so as to facilitate calculation of heat and to space out calculated heat values, so that the heat values can be indicated by using different colors.

Further, if a heatmap is generated for the original image for the first time when S302 is performed, that is, if generating the heatmap this time is generating the heatmap for the original image for the first time, $w_1$ is an initial value $w_0$ of the heat weight.

It should be noted that a value of $w_0$ may be set according to an actual requirement or an empirical value. This is not specifically limited in this embodiment of the present invention.

$\beta$ is a heat weight change function related to the zoom ratio, and is used to maintain stability of the heatmap. Heat in a same region for two continuous times may be controlled to meet a relationship by setting a proper $\beta$ function.

Further, $\beta$ is used to control an absolute value of a difference of total heat values obtained when heatmaps of a same region in the original image are generated to be less than or equal to a second preset threshold.

It should be noted that a value of the second preset threshold may be set according to an actual requirement. This is not specifically limited in this application. A smaller specified second preset threshold causes better continuity of generated heatmaps, and in a same region in the original image, colors presented in heatmaps at different zoom ratios are the same or close.

Specifically, if $\alpha$ is determined, after the original image is zoomed in by one level, an actual area represented by each cell becomes $$\left(\frac{a}{2}\right)^2$$

times an actual area originally represented by the cell, a quantity of data points and a heat value in the cell also change accordingly, and the corresponding $\beta$ needs to be calculated to ensure stability of heatmaps at different zoom ratios. The stability is defined as follows: In an ideal case, if data points are evenly distributed in an actual region represented by a cell, regardless of whether a map is zoomed in or out, a heat value of the actual region should remain unchanged.

Optionally, for a function relationship between $\beta$ and a zoom ratio, there may be multiple forms, and the function relationship may be, for example, a linear function, a power function, or the like.

Optionally, an example of a power function relationship between $\beta$ and a zoom ratio is provided herein, and the power function relationship specifically includes: $\beta = b^{\Delta Z}$, where b is a preset heat weight change parameter, and b is greater than or equal to 1, and is less than or equal to 4.

It should be noted that a value of b may be set according to an actual requirement. Specifically, b is used to stabilize heat of a heatmap. Therefore, the value of b is correlated with the value of a. If the original image is zoomed in by one level, that is, if Z is increased by 1, when a=2, an actual area represented by each cell does not change, and a weight w of each data point also does not need to change, as long as b=1; when a=1, an area represented by each cell becomes ¼ of an area originally represented by the cell, and if an effect of diffusion heat is not considered, the heat cannot be stabilized until w also becomes four times an original weight, that is, b=4.

Optionally, a method for determining b may be as follows: Two levels of zoom ratios i and (i+1) are compared, a heat value of a cell at the level i is H, and a geographical region represented by the cell is A. Therefore, at the level (i+1), heat of A includes basic heat of $$\left(\frac{2}{a}\right)^2$$

small cells and diffusion heat applied to A. A heat contribution value of each data point becomes b times an original heat contribution value. A heat value H' of A at the level (i+1) may be finally obtained by means of integral and meets a relationship of H=H'. Therefore, the value of b may be calculated.

It should be noted that when b is determined, the value may be obtained through calculation, or through repeated tests and adjustments according to experience.

The method for determining b is only an implementation, and does not specifically limit the value of b. There may be further another method for determining b, provided that it is ensured that the determined value of b can be used to implement a function of β.

Preferably, b is 1.3.

Specifically, a heat point region in a cell is defined as a region that is in the cell and in which a center point of the cell is used as a circle center and x is used as a radius. A basic heat value of each pixel in the region is equal, and is basic heat of the heat point region in the cell.

Figure 4:
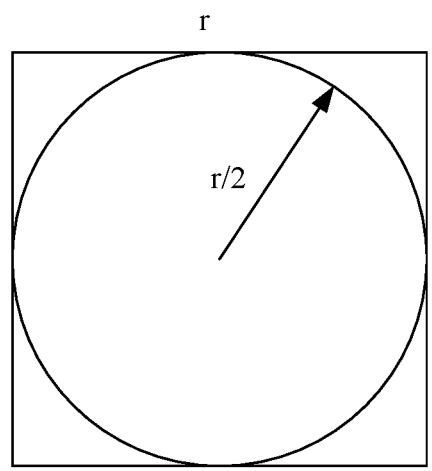
FIG. 4 is a schematic diagram of a cell and a location of a heat point region according to an embodiment of the present invention.

FIG. 4 shows a heat point region in a cell. A square region in the figure is the cell, and a circular region is the heat point region in the cell. In this example, x is $$\frac{r}{2}.$$

Specifically, for each cell obtained through division in S301, an execution process in S302 is the same. Using any cell (referred to as a first cell) obtained through division in S301 as an example, a process of calculating, according to the statistics of the original image and the heat weight w for generating a heatmap this time, basic heat of a heat point region that is in the first cell and in which a center point of the first cell is used as a circle center and x is used as a radius in S302 is described.

Optionally, the process of calculating, according to the statistics of the original image and the heat weight w for generating a heatmap this time, basic heat of a heat point region that is in the first cell and in which a center point of the first cell is used as a circle center and x is used as a radius may specifically include:

calculating the basic heat H=N*w of the heat point region in the first cell, where N is a total quantity of data points or statistic objects that are in the statistics of the original image and whose coordinates are located in a region, which corresponds to the first cell, in the original image.

For example, the original image is an electronic map. It is assumed that a cell covers the entire Tiananmen region, two data points are in the region, there are five persons (statistic objects) near the gate tower of Tiananmen, there are 20 persons near the square, and a heat weight of each person is w'. Therefore, basic heat H of a heat point region in the cell is $5^{w'}+20^{w'}=25^{w'}$.

For example, the original image is an electronic map. It is assumed that a cell covers the entire Tiananmen region, two data points are in the region, and a heat weight of each data point is w". Therefore, basic heat H of a heat point region in the cell is $2^{w''}$.

Optionally, another process of calculating basic heat of a heat point region in the first cell according to the statistics of the original image and the heat weight w for generating a heatmap this time may specifically include:

calculating the basic heat H=N*w+q of the heat point region in the first cell, where q is a preset constant, and may be set according to an actual requirement, and this is not specifically limited in this embodiment of the present invention.

It should be noted that a method for calculating basic heat of a heat point region in a cell may be implemented by using another method different from the foregoing two methods. This is not specifically limited in this embodiment of the present invention.

S303. Separately calculate, according to the basic heat H of the heat point region in each cell, diffusion heat to which each pixel in the current display region is subject.

A diffusion heat region of one cell is a region in a circle, in which a center of the cell is used as a circle center and R is used as a radius, except a heat point region in the cell, and R is greater than r.

Specifically, diffusion heat to which one pixel located in a diffusion heat region of at least one cell is subject is generated by a heat point region in each of the at least one cell.

Figure 5:
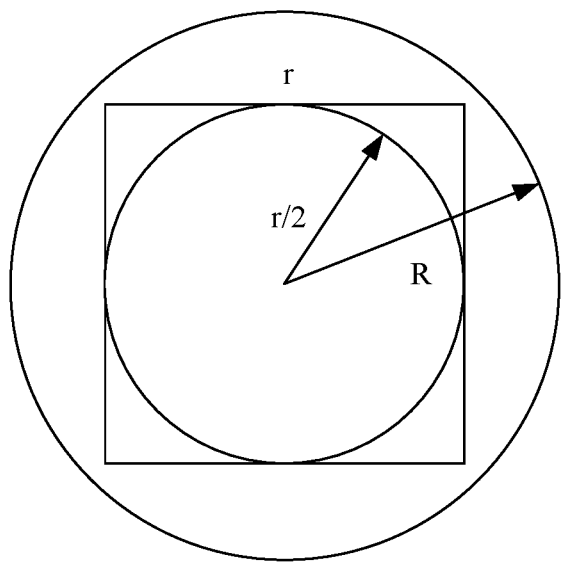
FIG. 5 is a schematic diagram of a cell and locations of a heat point region and a diffusion heat region according to an embodiment of the present invention.

For example, FIG. 5 shows a relationship among a cell, a heat point region, and a diffusion heat region.

Preferably, for effective calculation, it may be defined, in a limited manner, that R of the diffusion heat region of the cell is less than or equal to 2r.

Specifically, if any pixel in the current display region is located in a diffusion heat region of at least one cell, the any pixel in the current display region is subject to a diffusion heat component from each of the at least one cell. If any pixel in the current display region is not located in a diffusion heat region of any cell, the any pixel in the current display region is not subject to a diffusion heat component from any cell, and diffusion heat to which pixels of this type are subject is zero.

Optionally, in a process of calculating the diffusion heat to which each pixel in the current display region is subject, diffusion heat to which a pixel that is not located in a diffusion heat region of any cell is zero. Diffusion heat to which a pixel located in a diffusion heat region of at least one cell is calculated.

Optionally, in the process of calculating the diffusion heat to which each pixel in the current display region is subject, only diffusion heat to which a pixel located in a diffusion heat region of at least one cell may be calculated.

Specifically, a process of calculating diffusion heat to which each pixel that is in the current display region and that is located in a diffusion heat region of at least one cell is subject is the same, and is not described herein one by one. Herein, using only any pixel (referred to as a first pixel) that is in the current display region and that is located in a diffusion heat region of at least one cell as an example, a process of calculating, according to the basic heat of the heat point region in each cell, diffusion heat to which the first pixel is subject in S303 is described.

Further, the process of calculating the diffusion heat to which the first pixel is subject may specifically include: first calculating a diffusion heat component, to which the first pixel is subject, from each cell; and using a weighted sum of at least one diffusion heat component to which the first pixel is subject as the diffusion heat to which the first pixel is subject.

It should be noted that when the diffusion heat to which the first pixel is subject is calculated, a weighted value during weighting may be set according to an actual requirement. This is not specifically limited according to this embodiment of the present invention.

For example, when the diffusion heat to which the first pixel is subject is calculated, the weighted value during weighting may be in direct proportion to a distance between the pixel and the center of the cell.

Optionally, when the diffusion heat to which the first pixel is subject is calculated, the weighted value during weighting may be 1, so that the diffusion heat to which the first pixel is subject is a sum of at least one diffusion heat component to which the first pixel is subject.

The at least one diffusion heat component to which the first pixel is subject is generated by all cells to which at least one diffusion heat region in which the first pixel is located belongs.

It should be noted that a process of calculating a diffusion heat component, to which the first pixel is subject, from each cell is the same, and is not described herein one by one. Descriptions are provided by using an example of only a process of calculating a diffusion heat component, to which the first pixel is subject, from a second cell. The second cell is any one of the cell to which the at least one diffusion heat region in which the first pixel is located belongs.

Optionally, a method for calculating the diffusion heat component, to which the first pixel is subject, from the second cell may specifically include:

calculating the diffusion heat component $$h = H * \frac{d-r}{r},$$

to which the first pixel is subject, from the second cell, where d is a distance from a location of the first pixel to the center of a second cell, and H is basic heat of a heat point region in the second cell.

Specifically, d is a distance between the location of the pixel in the current display region and the center of the cell, and has a unit consistent with that of the side length r of the cell. Alternatively, d may be an actual distance between the location of the pixel in the original image and the center of the cell, provided that content of d is consistent with content of r.

It should be noted that a calculation manner of H is already described in detail in S302, and is not described herein again.

Optionally, a method for calculating the diffusion heat component, to which the first pixel is subject, from the second cell may specifically include:

calculating the diffusion heat component $$h = \sin\frac{\pi - \pi(d-r)}{2r},$$

to which the first pixel is subject, from the second cell, where, π may be 3.14.

It should be noted that a function for calculating the diffusion heat component, to which the first pixel is subject, from the second cell may be set according to an actual requirement, provided that it is ensured that the function monotonically decreases from 1 to 0.

Further, a pixel located in diffusion heat regions of multiple cells is subject to a diffusion heat component from each of the cells, and the diffusion heat components need to be calculated one by one.

It should be noted that a diffusion heat component, to which a pixel is subject, from a cell may be further calculated by using another method different from the foregoing two methods. This is not specifically limited in this embodiment of the present invention.

S304. Separately obtain total heat of each pixel in the current display region according to basic heat of the pixel in the current display region and the diffusion heat to which the pixel in the current display region is subject.

Specifically, a pixel that is located in a heat point region in a cell and that is in the current display region not only has basic heat, but also is subject to diffusion heat from another cell. Total heat of a pixel of this type is related to basic heat and diffusion heat to which the pixel of this type is subject.

Further, for each pixel located in a heat point region in a cell, an execution process of obtaining total heat of the pixel in S304 is the same. Herein, using any pixel (referred to as a second pixel) in a heat point region in a cell as an example, a process of obtaining total heat of the second pixel in S304 is described.

Optionally, a specific implementation of obtaining the total heat of the second pixel may include but is not limited to the following two manners:

Manner 1:

add diffusion heat, to which the second pixel is subject, to basic heat of the second pixel, to obtain the total heat of the second pixel.

Figure 6:
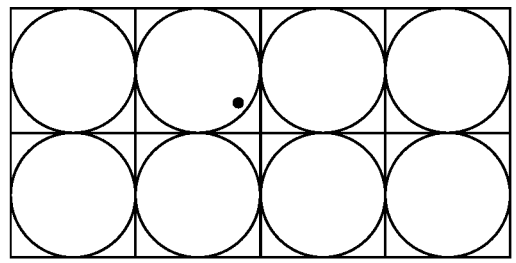
FIG. 6 is a schematic diagram of a location of a pixel according to an embodiment of the present invention.

For example, as shown in FIG. 6, it is assumed that a pixel A is located in a heat point region in one cell, basic heat of the pixel A is H, the pixel A is further located in diffusion heat regions of four cells, the pixel A is subject to diffusion heat components from heat point regions of the four cells, the diffusion heat components are respectively recorded as $h_1$, $h_2$, $h_3$, and $h_4$, and diffusion heat to which the pixel A is subject is $h_1+h_2+h_3+h_4$. In this way, total heat of the pixel A is $H+h_1+h_2+h_3+h_4$.

Manner 2:

perform weighting summation on diffusion heat, to which the second pixel is subject, to basic heat of the second pixel, to obtain the total heat of the second pixel.

It should be noted that a specific implementation of manner 2 is similar to that of manner 1. Details are not described herein. A weighted value during weighting in manner 2 may be set according to an actual requirement, and this is not specifically limited in this embodiment of the present invention.

It should be noted that when the total heat of the second pixel is being obtained, if the second pixel is not located in a diffusion heat region of any cell, the total heat of the second pixel is the basic heat of the second pixel.

Specifically, another type of pixel in the current display region may be located in a diffusion heat region of at least one cell and is not located in a heat point region in any cell. The pixel of this type is only subject to diffusion heat from another cell, and total heat of the pixel is related to the diffusion heat to which the pixel is subject.

Further, for each pixel that is located in a diffusion heat region of a cell and that is not in a heat point region in any cell, an execution process of obtaining total heat of the pixel in S304 is the same. Herein, using any pixel (referred to as a third pixel) that is located in a diffusion heat region of a cell and that is not located in a heat point region in any cell as an example, a process of obtaining total heat of the third pixel in S304 is described.

Specifically, a specific implementation of obtaining the total heat of the third pixel may include that diffusion heat to which the third pixel is subject is the total heat of the third pixel.

Figure 7:
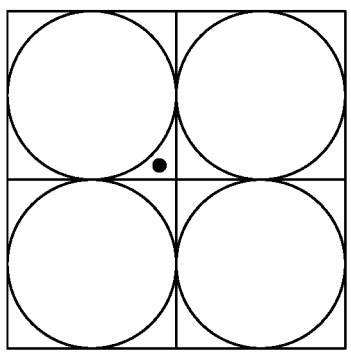
FIG. 7 is a schematic diagram of a location of another pixel according to an embodiment of the present invention.

For example, as shown in FIG. 7, it is assumed that a pixel B is located in diffusion heat regions of four cells and is not located in a heat point region in any cell, the pixel B is subject to diffusion heat components from heat point regions of the four cells, the diffusion heat components are respectively recorded as $h_1$, $h_2$, $h_3$, and $h_4$, and diffusion heat to which the pixel B is subject is $h_1+h_2+h_3+h_4$. In this way, total heat of the pixel B is $h_1+h_2+h_3+h_4$.

Figure 8:
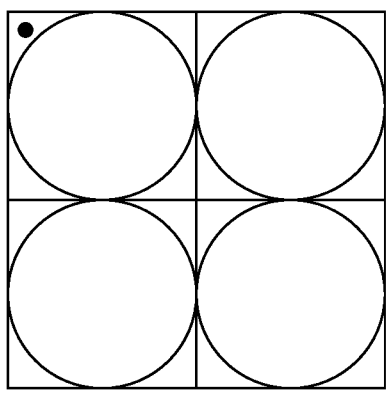
FIG. 8 is a schematic diagram of a location of still another pixel according to an embodiment of the present invention.

For example, as shown in FIG. 8, it is assumed that a pixel C is located in a diffusion heat region of only one cell and is not located in a heat point region in any cell, and the pixel C is only subject to a diffusion heat component from a heat point region in the cell. In this way, total heat of the pixel C is the diffusion heat component, to which the pixel is subject, from the heat point region in the cell.

S305. Present, in the current display region of the original image according to a preset heat presentation correspondence, a color corresponding to the total heat of each pixel, to obtain a heatmap of the current display region.

The preset heat presentation correspondence includes at least one heat value interval and a presented color in a one-to-one correspondence with each heat value interval.

Table 1 shows a preset heat presentation correspondence.

TABLE 1

| Heat value interval | Presented color |
|---|---|
| 0 ≤ H < 10 | Color 1 |
| 10 ≤ H < 20 | Color 2 |
| 20 ≤ H < 30 | Color 3 |
| 30 ≤ H < 40 | Color 4 |
| ... | ... |

A presented color in the preset heat presentation correspondence may be darkened as heat increases, and the presented color may be embodied by using a tone, saturation, luminance, and the like.

It should be noted that Table 1 describes only an example of content and a form of the preset heat presentation correspondence, and does not specifically limit the content and the form of the preset heat presentation correspondence.

Specifically, in S305, the preset heat presentation correspondence is queried first, to obtain the color corresponding to the total heat of each pixel in the current display region of the original image, and the color corresponding to the total heat of each pixel is displayed in the current display region of the original image, to obtain the heatmap of the current display region.

Further, after a user adjusts the zoom ratio of the original image, the current display region of the original image changes, and S301 to S305 of the method for generating a heatmap provided in this application are performed again, to generate a heatmap of a changed current display region. The heatmaps generated twice are displayed continuously with no discrete point. A same location in the original image presents a same or similar color in the heatmaps generated twice.

In the method for generating a heatmap provided in this application, first, each time a heatmap is generated, a heat point region in each cell and a diffusion heat region of the cell may include each location and detail in a current display region of the original image. Regardless of how the user adjusts the zoom ratio of the original image, the heatmap generated each time is continuous, ensuring continuity of the heatmap, so that the heatmap can reflect a region feature. Second, when a heatmap is locally generated, a side length r of a cell and a heat weight w are respectively correlated with a side length $r_1$ of a cell and a heat weight $w_1$ by using the cell change function α and the heat weight change function β, where the side length $r_1$ of the cell and the heat weight $w_1$ are used when a heatmap is previously generated. Based on this, by properly setting the cell change function α and the heat weight change function β, it can be ensured that an area of a region, which corresponds to one cell, in the original image is close each time a heatmap is generated, and heat in a same region in the original image is close each time a heatmap is generated. Regardless of how the user adjusts the zoom ratio of the original image, for a same location in the original image, a heat value at the location in a heatmap generated each time is close, ensuring accuracy of the heatmap.

The solution provided in this embodiment of the present invention is mainly described above from a perspective of a working process of the apparatus for generating a heatmap. It may be understood that for implementing the foregoing functions, the apparatus for generating a heatmap includes corresponding hardware structures and/or software modules executing various functions. Persons skilled in the art should be very easily aware that, units and algorithm steps in the examples described with reference to the disclosed embodiments in this specification may be implemented in a form of hardware or in a form of a combination of hardware and computer software in this application. Whether a function is executed by hardware or computer software driving hardware depends on particular applications and design constraint conditions of the technical solution. Persons skilled in the art may use a different method to implement the described functions for each particular application, but it should not be considered that the implementation goes beyond the scope of this application.

Function modules of the apparatus for generating a heatmap may be divided according to the method examples in the embodiments of the present invention. For example, function modules corresponding to various functions may be divided, or two or more functions may be integrated into one processing module. The foregoing integrated module not only may be implemented in a form of hardware, but also may be implemented in a form of a software function module. It should be noted that the module division in the embodiments of the present invention is an example, and is merely logical function division and may be another division manner in actual implementation.

Figure 9:
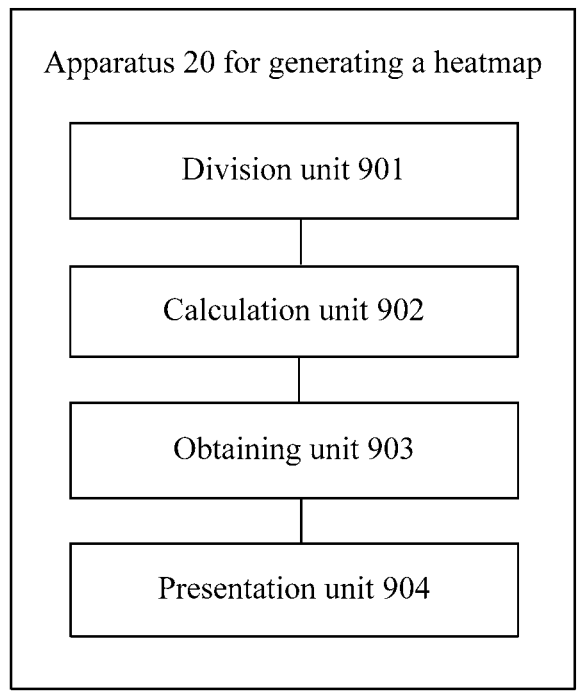
FIG. 9 is a schematic structural diagram of another apparatus 20 for generating a heatmap according to an embodiment of the present invention.

When various function modules corresponding to various functions are divided, FIG. 9 is a possible schematic structural diagram of an apparatus 20 for generating a heatmap related to the foregoing embodiment. The apparatus 20 for generating a heatmap includes: a division unit 901, a calculation unit 902, an obtaining unit 903, and a presentation unit 904. The division unit 901 is configured to support the apparatus 20 for generating a heatmap in execution of the procedure S301 in FIG. 3. The calculation unit 902 is configured to support the apparatus 20 for generating a heatmap in execution of the procedures S302 and S303 in FIG. 3. The obtaining unit 903 is configured to support the apparatus 20 for generating a heatmap in execution of the procedure S304 in FIG. 3. The presentation unit 904 is configured to support the apparatus 20 for generating a heatmap in execution of the procedure S305 in FIG. 3. All the related content of the steps used in the method embodiments may be cited in function descriptions of corresponding function modules, and details are not described herein.

Figure 10:
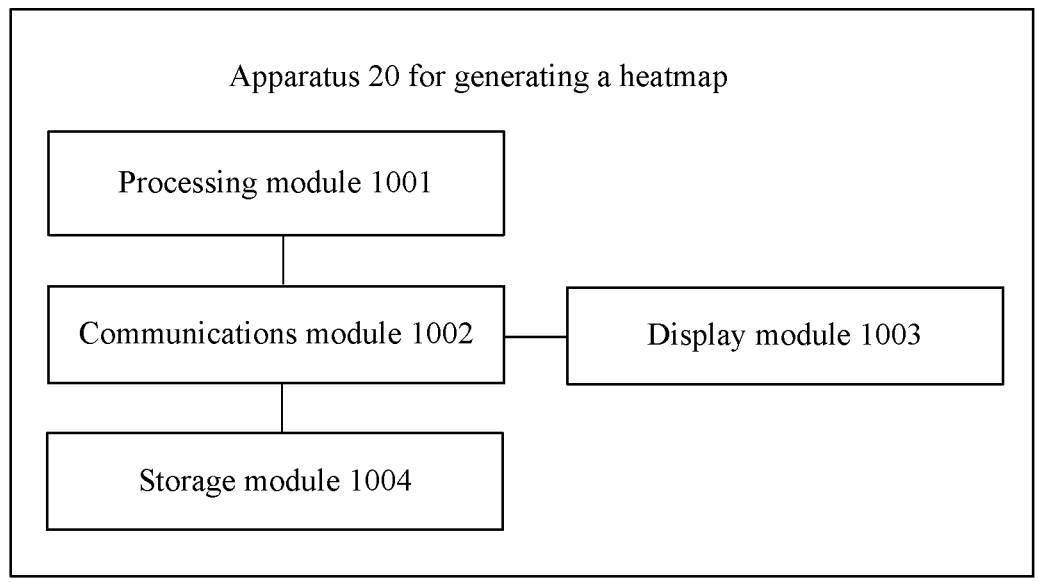
FIG. 10 is a schematic structural diagram of still another apparatus 20 for generating a heatmap according to an embodiment of the present invention.

When an integrated unit is used, FIG. 10 is a possible schematic structural diagram of an apparatus 20 for generating a heatmap related to the foregoing embodiment. The apparatus 20 for generating a heatmap may include: a processing module 1001, a communications module 1002, and a display module 1003. The processing module 1001 is configured to control and manage an action of the apparatus 20 for generating a heatmap. For example, the processing module 1001 is configured to support the apparatus for generating a heatmap in execution of the procedures S301 to S304 in FIG. 3, and/or configured to support execution of another procedure of the technology described in the specification. The communications unit 1002 is configured to support communication between the apparatus 20 for generating a heatmap and another network entity. The display module 1003 is configured to support the apparatus for generating a heatmap in execution of the procedure S305 in FIG. 3. The apparatus 20 for generating a heatmap may further include a storage module 1004, configured to store program code and data of the apparatus 20 for generating a heatmap.

The processing module 1001 may be a processor 201 in an entity structure of the apparatus 20 for generating a heatmap shown in FIG. 2, or may be a processor or a controller, for example, may be a CPU, a general-purpose processor, a DSP, an ASIC, an FPGA or another programmable logic device, a transistor logic device, a hardware component, or any combination thereof. The processing module 1001 may implement or execute various examples of logical blocks, modules, and circuits that are described with reference to content disclosed in this application. The processor may be further a combination implementing a calculation function, and include, for example, a combination of one or more microprocessors or a combination of a DSP and a microprocessor. The communications module 1002 may be a communications port, or may be a transceiver, a transceiver circuit, a communications interface, or the like. The display module 1003 may be a display 204 in the entity structure of the apparatus 20 for generating a heatmap shown in FIG. 2. The storage module 1004 may be a memory 202 in the entity structure of the apparatus 20 for generating a heatmap shown in FIG. 2.

When the processing module 1001 is a processor, the display module 1003 is the display 204, and the storage module 1004 is a memory, the apparatus 20 for generating a heatmap used in FIG. 10 of the embodiment of the present invention may be the apparatus 20 for generating a heatmap shown in FIG. 2.

The steps of the methods or the algorithms described with reference to the content disclosed in this application may be implemented by using hardware, or may be implemented by using a processor executing a software instruction. The software instruction may include a corresponding software module. The software module may be stored in a RAM, a flash memory, a ROM, an erasable programmable read-only memory (EPROM), an electrically erasable programmable read-only memory (EEPROM), a register, a hard disk, a removable hard disk, a compact disc read-only memory (CD-ROM), or any other type of storage medium well known in the art. An example of a storage medium is coupled to the processor, so that the processor can read information from the storage medium, and can write information to the storage medium. Certainly, the storage medium may also be a composition part of the processor. The processor and the storage medium may be located in the ASIC. In addition, the ASIC may be located in an interface device of a core network. Certainly, the processor and the storage medium, as discrete components, may also exist in the interface device of the core network.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, or a network device) to perform some of the steps of the methods described in the embodiments of this application. The foregoing storage medium includes: various media that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for generating a zoomed heatmap from a heatmap of an original image,
wherein the method is applied to an Internet architecture,
wherein the Internet architecture comprises a network server and at least one terminal,
wherein the network server collects statistics on user data of each terminal, and provides statistics to each terminal for data analysis, and
wherein the terminal interacts with the network server by using the Internet, obtains the statistics from the network server, and generates the heatmap,
wherein the heatmap is used in an electronic map, and
wherein the method comprises:
dividing a current display region of the original image on a screen into square cells having a side length of r, wherein $r=\alpha * r_1$,
wherein $r_1$ is a side length of a cell that is obtained through division when the heatmap of the original image is previously generated, and
wherein $\alpha$ is a cell change function related to a zoom ratio;
separately calculating, according to statistics of the original image and a heat weight $w=\beta * w_1$ for generating the zoomed heatmap, basic heat H of a heat point region that is in each cell and in which a center point of the cell is used as a circle center and x is used as a radius,
wherein basic heat of each pixel in one heat point region is H,
wherein the statistics comprises at least one data point used to reflect a region feature of the original image,
wherein $w_1$ is a heat weight used when the heatmap of the original image is previously generated,
wherein $\beta$ is a heat weight change function related to the zoom ratio, and
wherein x is less than or equal to r/2;
separately calculating, according to the basic heat H of the heat point region in each cell, diffusion heat to which each pixel in the current display region is subject,
wherein diffusion heat to which one pixel located in a diffusion heat region of at least one cell is subject is generated by a heat point region in each of the at least one cell,
wherein a diffusion heat region of one cell is a region in a circle in which a center of the cell is used as a circle center and R is used as a radius,
wherein the diffusion heat region excludes a heat point region in the cell, and
wherein R is greater than r;
separately obtaining total heat of each pixel in the current display region according to the basic heat of the pixel in the current display region and the diffusion heat to which the pixel in the current display region is subject; and
presenting, in the current display region of the original image and according to a preset heat presentation correspondence, a color corresponding to the total heat of each pixel in the current display region, to obtain a heatmap of the current display region.

2. The method according to claim 1,
wherein the separately calculating, according to statistics of the original image and a heat weight $w=\beta * w_1$ for generating the zoomed heatmap, basic heat of a heat point region that is in each cell and in which a center point of the cell is used as a circle center and x is used as a radius comprises:
calculating, according to the statistics of the original image and the heat weight w for generating the zoomed heatmap, basic heat $H=N*w$ of a heat point region in a first cell and in which a center point of the first cell is used as a circle center and x is used as a radius,
wherein the first cell is any one of the cells obtained by dividing the current display region, and
wherein N is a total quantity of data points or statistic objects that are in the statistics of the original image and whose coordinates are in a region, which corresponds to the first cell, in the original image.

3. The method according to claim 1, wherein the separately calculating,
according to the basic heat of the heat point region in each cell, diffusion heat to which each pixel in the current display region is subject comprises:
calculating, according to the basic heat of the heat point region in each cell, a diffusion heat component, to which a first pixel is subject, from the cell, wherein the first pixel is any pixel that is in the current display region and that is located in a diffusion heat region of at least one cell; and
using a weighted sum of at least one diffusion heat component to which the first pixel is subject as diffusion heat to which the first pixel is subject, wherein the at least one diffusion heat component to which the first pixel is subject is generated by each cell to which at least one diffusion heat region in which the first pixel is located belongs.

4. The method according to claim 3, wherein the calculating,
according to the basic heat of the heat point region in each cell, a diffusion heat component, to which a first pixel is subject, from the cell comprises:
calculating, according to basic heat of a heat point region in a second cell, a diffusion heat component $$h = H * \frac{d-r}{r},$$

to which the first pixel is subject, from the second cell, wherein the second cell is any one of the cells to which the at least one diffusion heat region in which the first pixel is located belongs, wherein d is a distance from a location of the first pixel to a center of the second cell, and wherein H is the basic heat of the heat point region in the second cell.

5. The method according to claim 1,
wherein $\alpha = a^{\Delta Z}$,
wherein a is a preset cell change parameter,
wherein a is greater than or equal to 1, and is less than or equal to 2, and
wherein $\Delta Z$ is obtained by subtracting, from a zoom ratio for the original image when the zoomed heatmap is generated, a zoom ratio for the original image when the heatmap is previously generated; and
wherein $\beta = b^{\Delta Z}$,
wherein b is a preset heat weight change parameter, and
wherein b is greater than or equal to 1, and is less than or equal to 4.

6. The method according to claim 1, wherein
if the generated heatmap of the current display region is a heatmap that is generated for the original image for a first time, $r_1$ is an initial value $r_0$ of the side length of the cell, and $w_1$ is an initial value $w_0$ of the heat weight.

7. The method according to claim 1, wherein
α is used to control an absolute value of a difference of actual lengths corresponding to r and $r_1$ in the original image to be less than or equal to a first preset threshold; and
wherein β is used to control an absolute value of a difference of total heat values obtained when heatmaps of a same region in the original image are generated to be less than or equal to a second preset threshold.

8. The method according to claim 1, wherein R is less than or equal to 2r.

9. The method according to claim 1, wherein the separately obtaining total heat of each pixel in the current display region according to the basic heat of the pixel in the current display region and the diffusion heat to which the pixel in the current display region is subject comprises:
adding or performing weighting summation on diffusion heat, to which a second pixel is subject, to basic heat of the second pixel, to obtain total heat of the second pixel, wherein the second pixel is any pixel located in a heat point region in a cell; or
diffusion heat to which a third pixel is subject being total heat of the third pixel, wherein the third pixel is any pixel that is located in a diffusion heat region of a cell and that is not located in a heat point region in any cell.

10. An apparatus for generating a zoomed heatmap from a heatmap of an original image,
wherein the apparatus comprises a terminal in an Internet architecture,
wherein the Internet architecture comprises a network server and at least one terminal,
wherein the network server collects statistics on user data of each terminal, and provides statistics to each terminal for data analysis, and
wherein the terminal interacts with the network server by using the Internet, obtains the statistics from the network server, and generates the heatmap,
wherein the heatmap is used in an electronic map, and
wherein the apparatus comprises:
at least one processor; and a non-transitory computer-readable storage medium coupled to the at least one processor and storing programming instructions for execution by the at least one processor, wherein the programming instructions Instruct the at least one processor to:
divide a current display region of the original image on a screen into square cells having a side length of r, wherein $r=a*r_1$,
wherein $r_1$ is a side length of a cell that is obtained through division when a heatmap of the original image is previously generated, and
wherein α is a cell change function related to a zoom ratio;
separately calculate, according to statistics of the original image and a heat weight $w=β*w_1$ for generating the zoomed heatmap, basic heat H of a heat point region that is in each cell and in which a center point of the cell is used as a circle center and x is used as a radius,
wherein basic heat of each pixel in one heat point region is H,
wherein the statistics comprises at least one data point used to reflect a region feature of the original image,
wherein $w_1$ is a heat weight used when the heatmap of the original image is previously generated,
wherein β is a heat weight change function related to the zoom ratio, and
wherein x is less than or equal to r/2;
separately calculate, according to the basic heat H of the heat point region in each cell, diffusion heat to which each pixel in the current display region is subject,
wherein diffusion heat to which one pixel located in a diffusion heat region of at least one cell is subject is generated by a heat point region in each of the at least one cell,
wherein a diffusion heat region of one cell is a region in a circle in which a center of the cell is used as a circle center and R is used as a radius,
wherein the diffusion heat region excludes a heat point region in the cell, and
wherein R is greater than r;
separately obtain total heat of each pixel in the current display region according to the basic heat of the pixel in the current display region and the diffusion heat to which the pixel in the current display region is subject;
wherein the basic heat of each pixel in the current display region and the diffusion heat to which each pixel in the current display region is subject are calculated by the at least one processor; and
present, in the current display region of the original image according to a preset heat presentation correspondence, a color corresponding to the total heat, which is obtained by the at least one processor, of each pixel in the current display region, to obtain a heatmap of the current display region.

11. The apparatus according to claim 10, wherein the programming instructions Instruct the at least one processor to:
calculate basic heat $H=N*w$ of a heat point region in a first cell,
wherein the first cell is any one of the cells obtained by dividing the current display region, and N is a total quantity of data points or statistic objects that are in the statistics of the original image and whose coordinates are in a region, which corresponds to the first cell, in the original image.

12. The apparatus according to claim 10, wherein the programming instructions instruct the at least one processor to:
calculate, according to the basic heat of the heat point region in each cell, a diffusion heat component, to which a first pixel is subject, from the cell, wherein the first pixel is any pixel that is in the current display region and that is located in a diffusion heat region of at least one cell; and
use a weighted sum of at least one diffusion heat component to which the first pixel is subject as diffusion heat to which the first pixel is subject, wherein the at least one diffusion heat component to which the first pixel is subject is generated by each cell to which at least one diffusion heat region in which the first pixel is located belongs.

13. The apparatus according to claim 12, wherein the programming instructions instruct the at least one processor to:
calculate, according to basic heat of a heat point region in a second cell, a diffusion heat component $$h = H * \frac{d-r}{r},$$

to which the first pixel is subject, from the second cell, wherein the second cell is any one of the cells to which the at least one diffusion heat region in which the first pixel is located belongs, wherein d is a distance from a location of the first pixel to a center of the second cell, and wherein H is the basic heat of the heat point region in the second cell.

14. The apparatus according to claim 10,
wherein $\alpha = a^{\Delta Z}$,
wherein a is a preset cell change parameter,
wherein a is greater than or equal to 1, and is less than or equal to 2, and
wherein $\Delta Z$ is obtained by subtracting, from a zoom ratio for the original image when the zoomed heatmap is generated, a zoom ratio for the original image when the heatmap is previously generated; and
wherein $\beta = b^{\Delta Z}$,
wherein b is a preset heat weight change parameter, and
wherein b is greater than or equal to 1, and is less than or equal to 4.

15. The apparatus according to claim 10, wherein
if the generated heatmap of the current display region is a heatmap that is generated for the original image for a first time, $r_1$ is an initial value $r_0$ of the side length of the cell, and $w_1$ is an initial value $w_0$ of the heat weight.

16. The apparatus according to claim 10, wherein
$\alpha$ is used to control an absolute value of a difference of actual lengths corresponding to r and $r_1$ in the original image to be less than or equal to a first preset threshold; and
wherein $\beta$ is used to control an absolute value of a difference of total heat values obtained when heatmaps of a same region in the original image are generated to be less than or equal to a second preset threshold.

17. The apparatus according to claim 10, wherein R is less than or equal to 2r.

18. The apparatus according to claim 10, wherein the programming instructions instruct the at least one processor to:
add or perform weighting summation on diffusion heat, to which a second pixel is subject, to basic heat of the second pixel, to obtain total heat of the second pixel, wherein the second pixel is any pixel located in a heat point region in a cell; or
diffusion heat to which a third pixel is subject being total heat of the third pixel, wherein the third pixel is any pixel that is located in a diffusion heat region of a cell and that is not located in a heat point region in any cell.

* * * * *

UNITED STATES PATENT AND TRADEMARK OFFICE
CERTIFICATE OF CORRECTION

PATENT NO. : 10,783,673 B2
APPLICATION NO. : 16/279622
DATED : September 22, 2020
INVENTOR(S) : Lisheng Gao et al.

Page 1 of 1

It is certified that error appears in the above-identified patent and that said Letters Patent is hereby corrected as shown below:

In the Claims

In Column 23, Line 47, in Claim 10, delete "Instruct" and insert -- instruct --, therefor.

In Column 24, Line 31, in Claim 11, delete "Instruct" and insert -- instruct --, therefor.

Signed and Sealed this
Twenty-ninth Day of December, 2020

Andrei Iancu
*Director of the United States Patent and Trademark Office*